United States Patent
Suryanarayana et al.

(10) Patent No.: US 11,955,835 B2
(45) Date of Patent: Apr. 9, 2024

(54) METHOD AND CONTROL TO INTEGRATE FUEL CELLS IN DATACENTERS WITH RING-BUS ARCHITECTURE

(71) Applicant: ABB Schweiz AG, Baden (CH)

(72) Inventors: Harish Suryanarayana, Apex, NC (US); Li Qi, Cary, NC (US); Taosha Jiang, Cary, NC (US); Yuzhi Zhang, Apex, NC (US); Silvio Colombi, Losone (CH)

(73) Assignee: ABB Schweiz AG, Baden (CH)

( * ) Notice: Subject to any disclaimer, the term of this patent is extended or adjusted under 35 U.S.C. 154(b) by 14 days.

(21) Appl. No.: 17/500,553

(22) Filed: Oct. 13, 2021

(65) Prior Publication Data
US 2023/0115739 A1    Apr. 13, 2023

(51) Int. Cl.
*H02J 9/06* (2006.01)
*G06F 1/26* (2006.01)

(52) U.S. Cl.
CPC .............. *H02J 9/062* (2013.01); *H02J 9/068* (2020.01); *G06F 1/263* (2013.01); *H02J 2300/30* (2020.01)

(58) Field of Classification Search
CPC ... H02J 2300/30; H02J 3/38–50; G06F 1/263; G06F 1/30–305
See application file for complete search history.

(56) References Cited

U.S. PATENT DOCUMENTS

| | | |
|---|---|---|
| 8,504,215 B1 | 8/2013 | McCorkendale et al. |
| 8,937,405 B2 | 1/2015 | Park |
| 8,970,176 B2 | 3/2015 | Ballatine et al. |
| 9,490,660 B2 | 11/2016 | Monahan |
| 9,735,616 B2 | 8/2017 | Colombi et al. |
| 9,819,192 B2 | 11/2017 | Teichmann |
| 9,923,371 B1 * | 3/2018 | Emert ............... H02J 9/062 |
| 10,148,122 B2 | 12/2018 | Reddy et al. |

(Continued)

FOREIGN PATENT DOCUMENTS

CN    207459824 U    6/2018

OTHER PUBLICATIONS

T. Jiang et al., "Data Center Isolated Parallel Ring Bus Differential Protection Scheme," Jun. 28, 2021, 2021 IEEE 12th International Symposium on Power Electronics for Distributed Generation Systems (PEDG), Chicago, IL, USA, 2021, pp. 1-6. (Year: 2021).*

(Continued)

*Primary Examiner* — Daniel Cavallari
*Assistant Examiner* — David A Shiao
(74) *Attorney, Agent, or Firm* — Leydig, Voit & Mayer, Ltd.

(57) ABSTRACT

A system includes: a ring bus; a plurality of static uninterruptible power supplies (UPSs), each static UPS of the plurality of static UPSs including: at least one battery; an input that is electrically connected to a first external electrical power source; and an output that is electrically connected to a load, and, via a first corresponding choke, to the ring bus; at least one fuel-cell interface converter (FIC) that converts direct current (DC) electrical power to alternating current (AC) electrical power, each FIC of the at least one FIC being electrically connected to the ring bus via a second corresponding choke; and a fuel cell module corresponding to and electrically connected to each FIC, the fuel cell module including a fuel cell.

17 Claims, 7 Drawing Sheets

(56) References Cited

U.S. PATENT DOCUMENTS

| | | | |
|---|---|---|---|
| 10,203,735 B2 | 2/2019 | Gross et al. | |
| 10,322,637 B2 | 6/2019 | Srinivasan et al. | |
| 10,331,153 B2 | 6/2019 | Fallon | |
| 10,756,546 B2 | 8/2020 | Pmsvvsv et al. | |
| 10,797,514 B2 | 10/2020 | Gross et al. | |
| 11,368,046 B2* | 6/2022 | Panfil | H02J 9/062 |
| 2002/0006536 A1 | 1/2002 | Liu et al. | |
| 2005/0200205 A1* | 9/2005 | Winn | H02J 9/08 307/64 |
| 2008/0034256 A1 | 2/2008 | Mosman | |
| 2014/0152097 A1* | 6/2014 | Kitaji | H02J 9/061 307/19 |
| 2015/0288220 A1* | 10/2015 | Gurunathan | H02J 3/46 307/65 |
| 2016/0020646 A1* | 1/2016 | Colombi | H02J 9/062 307/65 |
| 2016/0181864 A1* | 6/2016 | Reddy | G06F 1/30 307/66 |
| 2016/0380477 A1* | 12/2016 | Mitsui | H01M 8/04328 307/65 |
| 2017/0005357 A1* | 1/2017 | Mermelstein | H01M 8/04671 |
| 2017/0070088 A1* | 3/2017 | Berntsen | H01M 8/04302 |
| 2018/0052431 A1 | 2/2018 | Shaikh et al. | |
| 2018/0076658 A1 | 3/2018 | Mannuccini et al. | |
| 2018/0076659 A1* | 3/2018 | Giuntini | H02H 3/05 |
| 2018/0107260 A1 | 4/2018 | Cifala et al. | |
| 2018/0342876 A1* | 11/2018 | Agnew | H01M 16/006 |
| 2019/0067986 A1 | 2/2019 | Haj-Maharsi et al. | |
| 2019/0146565 A1 | 5/2019 | Cader et al. | |
| 2019/0319530 A1 | 10/2019 | Giuntini et al. | |
| 2022/0069613 A1* | 3/2022 | Reddy | H02J 7/0068 |

OTHER PUBLICATIONS

Colombi, "ABB's ring bus with static UPS for critical power applications," *ABB Review*, 1 (2019): 12 pp. (Feb. 28, 2019).

Jiang et al., "Data Center Isolated Parallel Ring Bus Differential Protection Scheme," abstract, *2021 IEEE 12th International Symposium on Power Electronics for Distributed Generation Systems (PEDG)*, 1 p. (Jun. 28-Jul. 1, 2021).

European Patent Office, International Search Report in International Patent Application No. PCT/IB2022/059795, 4 pp. (dated Feb. 3, 2023).

European Patent Office, Written Opinion in International Patent Application No. PCT/IB2022/059795, 7 pp. (dated Feb. 3, 2023).

* cited by examiner

METHOD AND CONTROL TO INTEGRATE FUEL CELLS IN DATACENTERS WITH RING-BUS ARCHITECTURE

BACKGROUND

It may be desirable to use one or more fuel cells, for example, hydrogen fuel cells, as a source of primary or backup power in an electrical architecture of a datacenter or similar facility. One such architecture is an isolated-parallel ring bus (IPRB) datacenter architecture. Reliable integration of one or more fuel cells into a datacenter architecture may need to address the existence of various fuel cell technologies with different start-up and ramp times. The start-up time is the amount of time required, after a command is given to start the fuel cell, for the fuel cell to start producing power. The ramp-up or ramp-down time is the amount of time required to change the amount of production or power—for example the time taken to go from 20% power production to 80% power production. Different fuel cell technologies may have different start-up and ramp times. For example, proton-exchange membrane (PEM) and Alkaline fuel cells have fast starting capabilities, but solid oxide fuel cells (SOFC) and phosphoric acid fuel cells (PAFC) have much longer start-up times. Further, reliability and electrical protection aspects of newer fuel cell technologies may still be at a developmental stage. These newer technology fuel cells may need to be integrated into a datacenter electrical architecture without sacrificing reliability of critical datacenter loads.

In addition, it may be desirable to be able to provide utility grid support and grid ancillary services using power generation capabilities when fuel cells are integrated into a IPRB architecture without sacrificing reliability.

BRIEF SUMMARY

One or more embodiments of the present invention may provide a system comprising: a ring bus; a plurality of static uninterruptible power supplies (UPSs), each static UPS of the plurality of static UPSs comprising: at least one battery; an input that is electrically connected to a first external electrical power source; and an output that is electrically connected to a load, and, via a first corresponding choke, to the ring bus; at least one fuel-cell interface converter (FIC) that converts direct current (DC) electrical power to alternating current (AC) electrical power, each FIC of the at least one FIC being electrically connected to the ring bus via a second corresponding choke; and a fuel cell module corresponding to and electrically connected to each FIC, the fuel cell module comprising a fuel cell.

Further, one or more embodiments of the present invention may provide a method for injecting electrical power from at least one fuel cell module into a ring bus architecture. The ring bus architecture may comprise: a ring bus; a plurality of static uninterruptible power supplies (UPSs), each static UPS of the plurality of static UPSs comprising: at least one battery; an input that is electrically connected to an external electrical power source; and an output that is electrically connected to a load, and, via a first corresponding choke, to the ring bus. The method may comprise: electrically connecting the at least one fuel cell module in series with a corresponding fuel-cell interface converter (FIC) and a second corresponding choke to the ring bus; and starting the at least one fuel cell module.

Further still, one or more embodiments of the present invention may provide a method of turning on at least one fuel cell module in a system without interrupting power to a system load. The system may comprise: a ring bus; a plurality of static uninterruptible power supplies (UPSs), each static UPS of the plurality of static UPSs comprising: at least one battery; an input that is electrically connected to an external electrical power source; and an output that is electrically connected to a load, and, via a first corresponding choke, to the ring bus. The method may comprise: sending a signal to a fuel cell system to start up, the fuel cell system comprising the at least one fuel cell module, a fuel-cell interface converter (FIC) electrically connected to an output of the at least one fuel cell module, and a choke that electrically connects an output of the FIC to the ring bus; providing, from the at least one battery, electrical power during start-up of the fuel cell system; supplying electrical power from the fuel cell system to at least one load via droop control applied to the FIC and the at least one static UPS, and the ring bus; and reducing power consumption from an source external to the system.

DETAILED DESCRIPTION

One or more embodiments of the present disclosure may integrate fuel cells as power sources in datacenters and other mission critical systems that require protected power by connecting fuel cell modules through a corresponding fuel cell interface converter (FIC) to the ring in an isolated-parallel ring bus with static UPS architecture (IPRB). Each fuel cell module may include a fuel cell and all the components necessary to supply electrical power starting with a fuel (for example, hydrogen). The fuel cell may be a proton-exchange membrane (PEM) fuel cell, an alkaline fuel cell, a solid oxide fuel cell (SOFC), or a phosphoric acid fuel cell (PAFC), among others. In the IPRB architecture, the UPS output voltage amplitude and frequency may be controlled using droop controls that allow equal sharing of load without the need for any communication between the UPSs for the purpose of load sharing. The power may be shared through the ring. With similar droop control incorporated into the FIC as well, it may be possible to control the amount of power drawn from an external electrical power source such as a utility by the datacenter by simply turning on the FIC without the need for communication with the UPSs.

Since the FIC supplies power to the ring and not directly to the load, the load may be isolated from start-up and other transients at the FIC through the IPRB choke. If during a power failure event, the fuel cell modules need time to start up, the UPS batteries may provide interim supply to the loads, just as in the case of using generators for back-up power. Thus, the critical load in the datacenter may be maintained unaffected. The protection schemes used in the IPRB architecture may be used for protection design of the FIC as well.

Depending on the FIC droop controls and number of FIC units, fuel cell modules may provide protected primary or backup power to the datacenter, possibly replacing or reducing the use of diesel generators.

Some methods to integrate one or more fuel cell modules into a datacenter architecture may involve a one-to-one replacement of a diesel generator by a fuel cell module or may involve directly integrating the fuel cell modules onto a direct current (DC) server rack.

Figure 1:
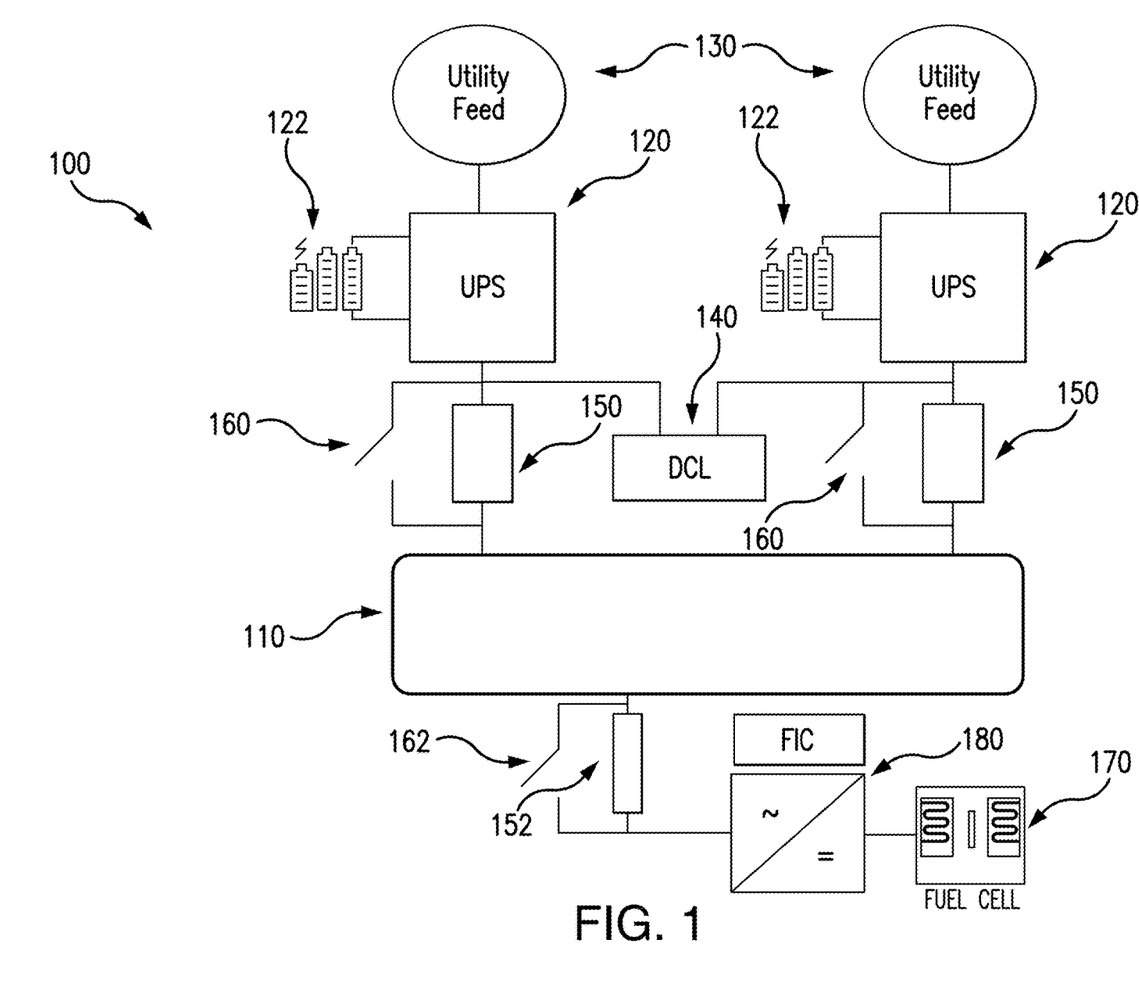
FIG. 1 shows a fuel cell module integrated into an IPRB architecture in accordance with one or more embodiments.

One or more embodiments of the present disclosure may integrate a fuel cell module into an IPRB architecture as shown in FIG. 1. The isolated parallel ring-bus (IPRB) architecture with static uninterruptible power supply (UPS) works on the concept of using droop control (droop frequency based on active power and droop voltage based on reactive power) in each UPS such that the power from the loads is shared equally between the UPSs. In one or more embodiments of the present disclosure, the fuel cell module may be integrated into the ring-bus through a fuel-cell interface converter (FIC). The FIC may implement the droop control to power the loads via the ring bus.

By supplying power to the load in the manner described above, the same protection scheme as used in the ring bus may also be used to integrate the FIC and fuel cell module. This may ensure that the reliability of the setup is maintained. The FIC may also be able to provide the short-circuit current supply capability similar to a UPS if integrated with additional short-term energy storage in the form of batteries or ultracapacitors.

One or more embodiments of the present disclosure may enable providing grid ancillary services to lower total system costs and improve reliability.

Figure 2:
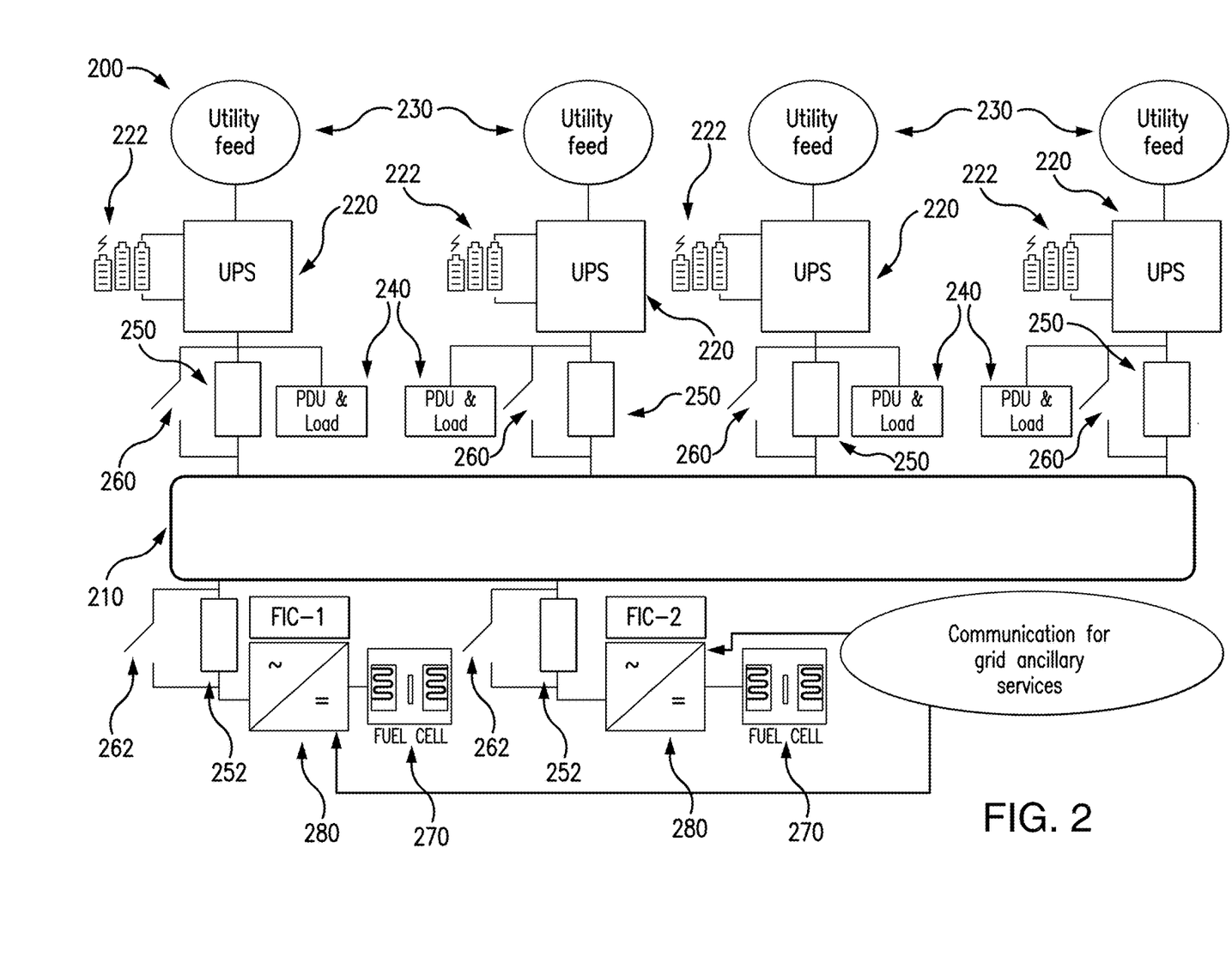
FIG. 2 shows fuel cell modules integrated into an IPRB architecture and receiving communication for grid ancillary services in accordance with one or more embodiments.

Referring to FIG. 2, connecting the FIC to the ring bus may allow indirect and smooth control of the amount of power drawn from the utility through the droop parameters. By communicating with only the FIC, a reduction in utility power draw (demand-response) may be possible. Cost and reliability may also be optimized by reducing the utility power draw during high-cost periods or when there is a high possibility of grid failure (say during weather events).

Figure 3:
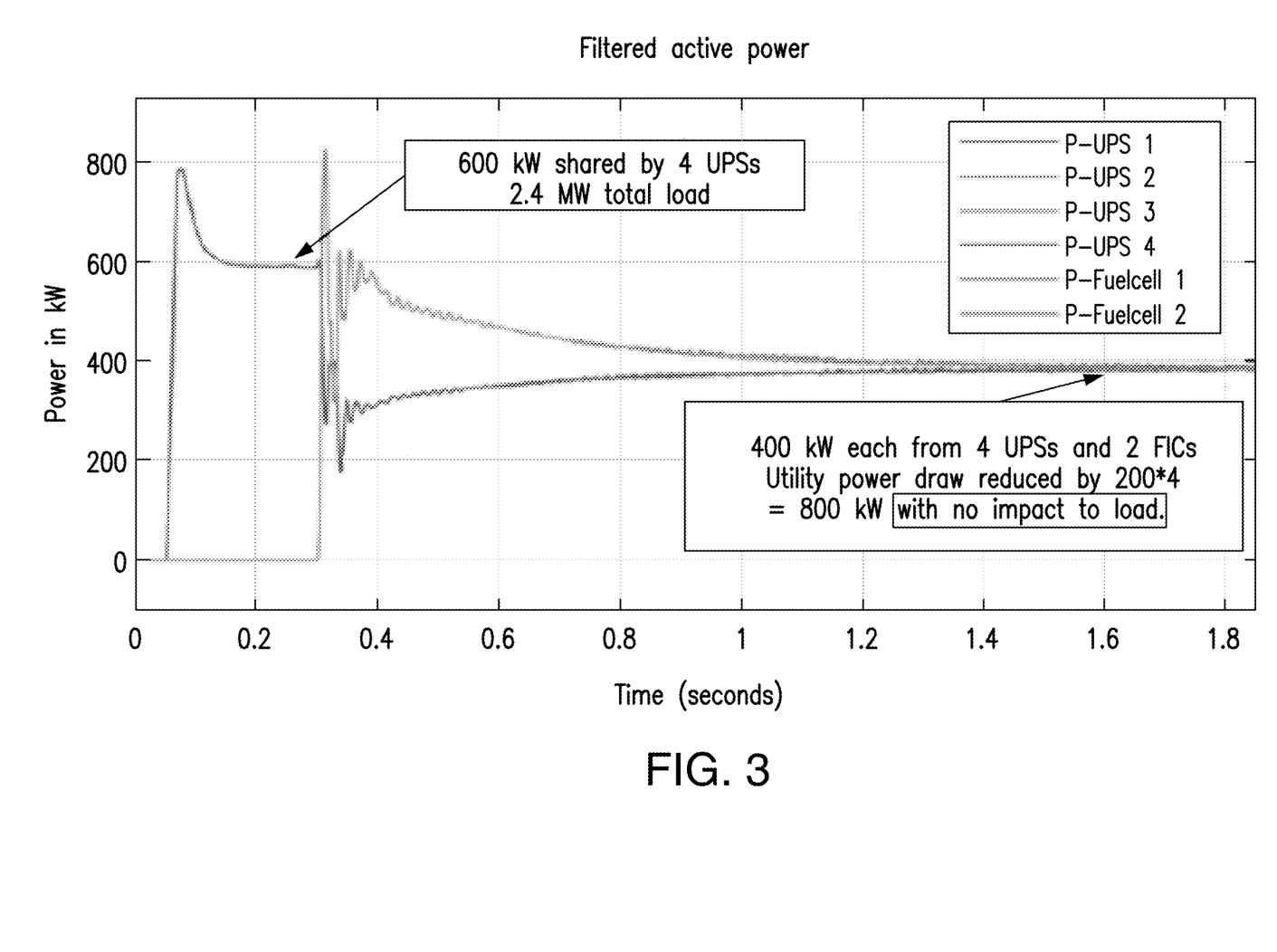
FIG. 3 shows filtered active power from uninterruptible power supplies and fuel-cell interface converters as a function of time in accordance with one or more embodiments.
Figure 4A:
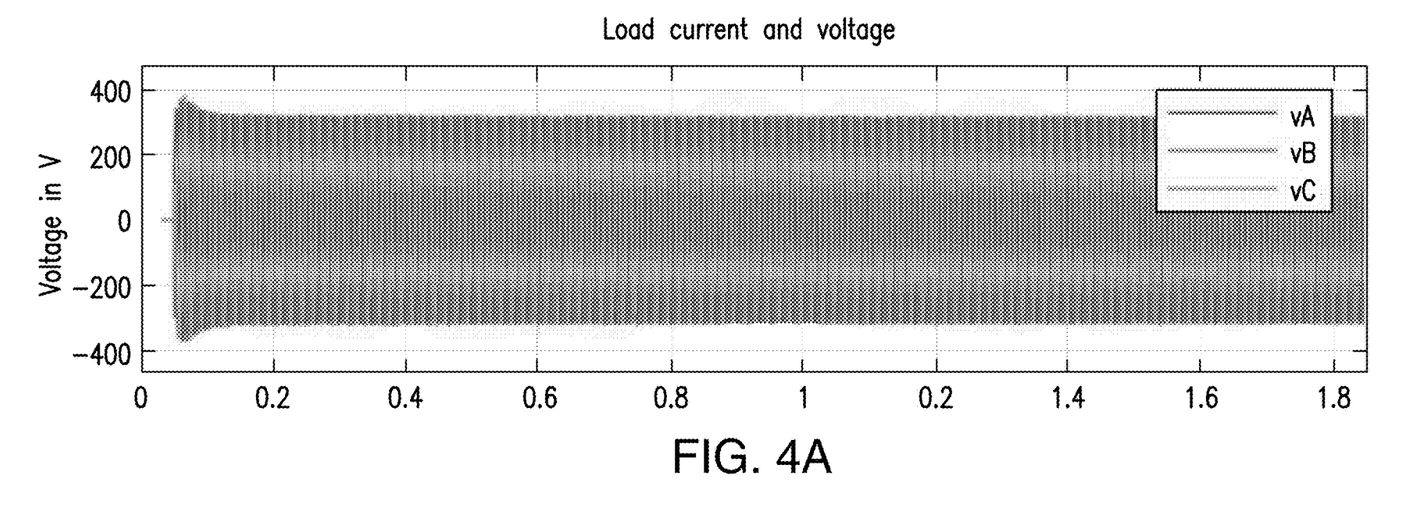
FIGS. 4A and 4B show load voltage and load current, respectively, as a function of time in accordance with one or more embodiments.
Figure 4B:
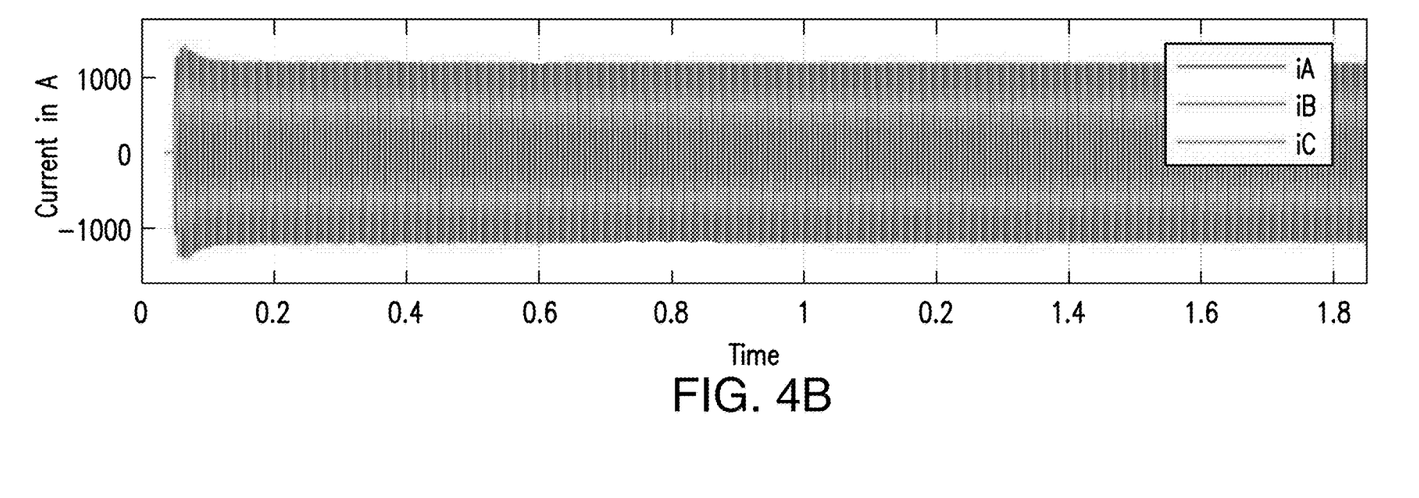

FIG. 2 shows an example ring-bus system. This system has been simulated for proof of concept assuming the FICs have similar behavior, droop control and IPRB chokes as those of the UPSs. In the simulation, each UPS feeds a 600 kW load. Thus a total load of 2.4 MW is being supplied. When the FICs are turned on, since there are 6 sources now, each UPS will only draw 400 kW (that is, 2.4 MW divided by 6) from the utility. Thus, the power drawn from the utility has been reduced by 800 kW, which is being supplied through the two FICs. This is shown graphically in FIG. 3. In FIGS. 4A and 4B, a load voltage and current, respectively, are shown where it is clear that there is no disturbance to the load.

Figure 5:
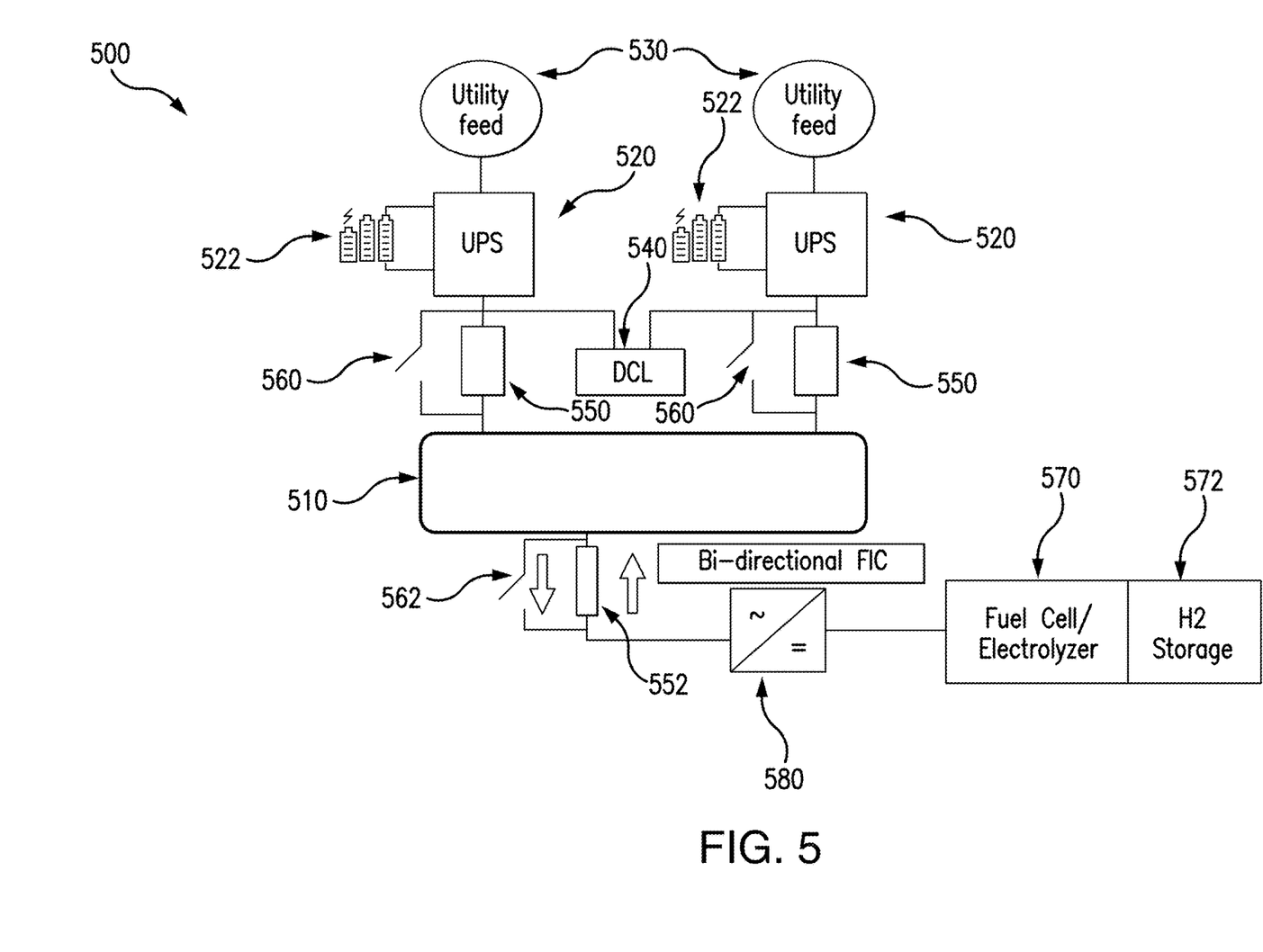
FIG. 5 shows a bidirectional fuel-cell interface converter integrated into an IPRB architecture in accordance with one or more embodiments.

As seen in FIG. 5, in one or more embodiments, power can be drawn from the ring by the FIC during periods of low-electricity cost or low-load. To do this, a fuel cell module/electrolyzer system may be connected to the FIC, which may use this electricity to convert water back to hydrogen.

One or more embodiments is shown in FIG. 5. A power rating of the FIC may be similar to or higher than a power rating of the UPS. Multiple FICs may be used for redundancy or scalability. The FIC may draw power from the IPRB system as well—acting as either a controllable load or a controllable source. UPS efficiencies may be highest at 50% to 60% loading but may drop rapidly for less than 25% loading. The FIC may control the loading so that all UPSs operate at optimal efficiency. If the FIC is always connected and on (even with very light loads), ramp-up and ramp-down times may be improved. The FIC may be designed with these design considerations. Grid ancillary services may be provided directly by controlling the FIC.

Figure 6:
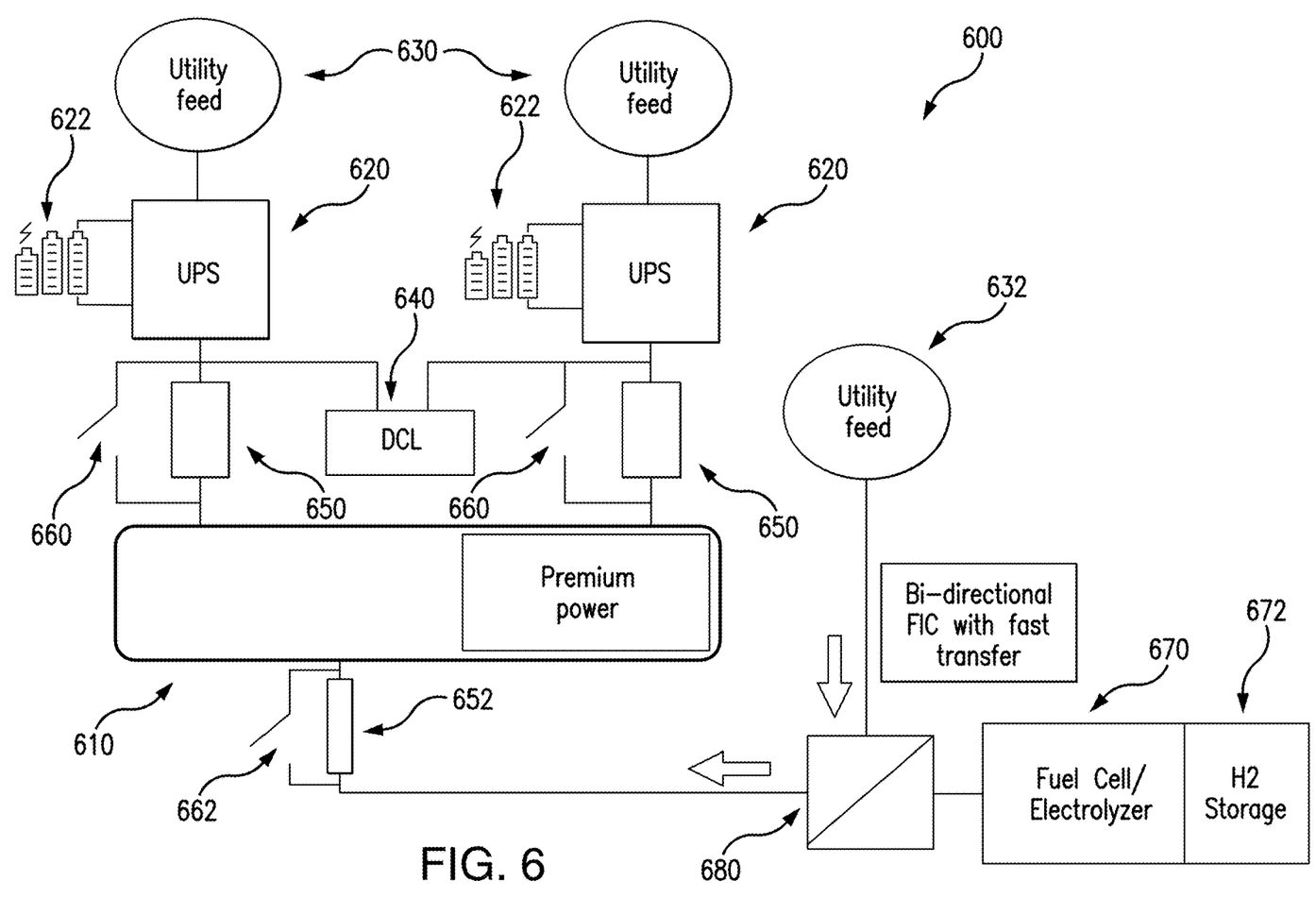
FIG. 6 shows a bidirectional fuel-cell interface converter connected to an external electrical power source and integrated into an IPRB architecture in accordance with one or more embodiments.

Since the power at the ring is "premium" power, meaning protected and pure power, this power may be too expensive to use for the purpose of electrolysis. As seen in FIG. 6, the FIC itself can be designed such that the power electronics can be used for multiple purposes including converting DC from fuel cell modules to AC to connect to the ring-bus and supply power, and converting utility/grid AC to DC to power an electrolyzer and generate local hydrogen during low-demand periods.

FIG. 6 shows a bidirectional FIC integrated into the IPRB architecture according to one or more embodiments. Power may be drawn directly from a utility when available (and cost-effective) for hydrogen generation, without using the premium and protected clean power on the ring bus. Since the FIC system will only either be delivering power to the ring or drawing power for hydrogen generation—never both at the same time, the same power electronic hardware may be used. Typically, in one embodiment the same inverter can be used for AC/DC or DC/AC conversion together with contactors or similar switches to connect the AC side of the inverter to the ring bus or the utility.

Figure 7:
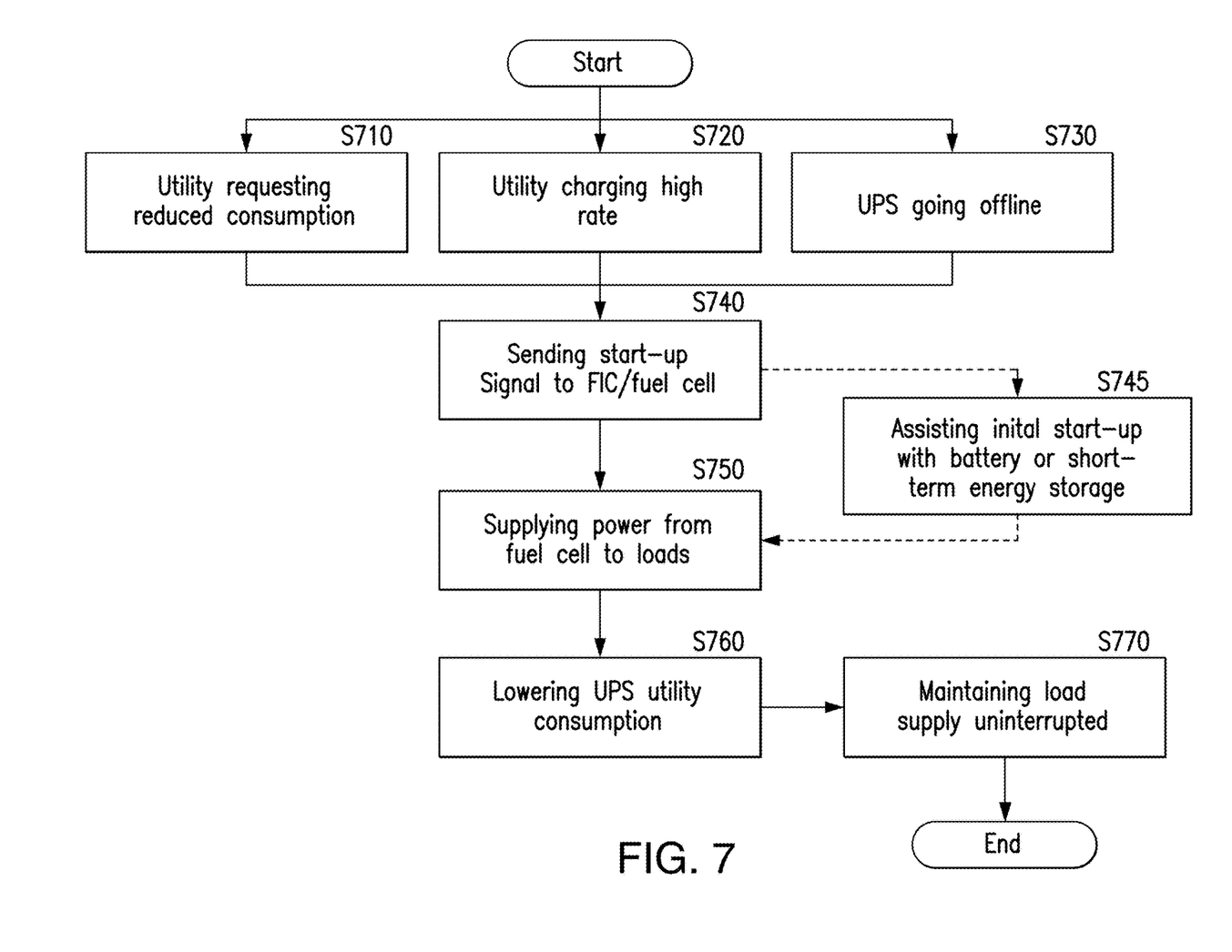
FIG. 7 shows a flowchart of turning on fuel cell modules to provide power to the system load without interruption in accordance with one or more embodiments.

FIG. 7 shows a flowchart of turning on fuel cell modules to provide power to the system load without interruption.

Datacenters and other facilities with mission critical systems need a source of protected power, namely, electrical power that is available and reliable. An isolated-parallel ring bus (IPRB) architecture may provide this power. It may be desirable to add one or more fuel cell modules to the IPRB to serve either as a primary or a backup source of power.

Referring to FIG. 1, an IPRB system 100 may include an AC ring bus 110. The system 100 may also include a plurality of static uninterruptible power supplies (UPSs) 120. Each static UPS 120 may be a double-conversion UPS that includes a rectifier that converts input AC power to DC power and an inverter that converts DC power to AC power. The output of the rectifier and the input of the inverter may be connected via a DC bus. Each static UPS 120 may include one or more batteries 122 and/or other power storage devices, for example, ultracapacitors, connected to the DC bus. The batteries 122 and other power storage devices may be integrated into the UPS 120 or external to the UPS 120. Each static UPS 120 may include an input that is electrically connected to an external power source 130, for example, a utility feed or utility grid. The external power source 130 may provide AC power to the static UPS 120. The static UPS 120 may output protected power, or "premium" power that has been cleaned to reduce total harmonic distortions to a level acceptable to the critical load supported by the IPRB system 100. The chokes and characteristics of the static UPSs 120 may each be chosen to be the same.

The output of the UPS 120 may be electrically connected to a load 140 through a power distribution unit (PDU), which includes a transformer to adjust the UPS 120 output voltage to the level required by the load 140. The load 140 may be a dual-corded load (DCL) that is electrically connected to the output of a second static UPS 120. Thus, in normal operating conditions, a dual-corded load 140 may be shared between two (or more) static UPSs 120, perhaps with each UPS 120 providing 50% of the power needed by the DCL 140. In the event of a loss of power from one UPS 120, the remaining UPS 120 may provide 100% of the power required by the DCL 140.

Each static UPS 120 may also be electrically connected to the ring bus 110 via a choke 150. The system 100 may also include a bypass circuit breaker 160 in parallel with the choke 150. If the system 100 includes more than two static UPSs 120 connected to the ring bus 110, in the event of a loss of power from one static UPS 120, the total load being supplied by the IPRB system 100 will automatically be redistributed between the remaining static UPSs 120 based on droop control. No communication between the static UPSs 120 may be needed to redistribute the power.

Referring again to FIG. 1, one or more fuel cell modules 170 may be incorporated into the IPRB system 100 to provide primary or backup power to the system. The fuel cell module 170 may be a hydrogen fuel cell module, but other types of fuel cell modules may also be used, including hydrocarbon (for example, methane), solid acid, and alkaline fuel cell modules, among others. The fuel cell module 170 may output DC power that is converted to AC power by a fuel-cell interface converter (FIC) 180 that is connected to the ring bus 110 via a choke 152. A bypass circuit breaker 162 may be in parallel with the choke 152. The value of this choke 152 may be the same as chokes 150 used with the static UPSs 120 or different, depending in part on the characteristics of the fuel cell module 170 and the FIC 180. Power from a fuel cell module 170 may be added to the IPRB system 100 without interruption by starting up the fuel cell module 170. The droop control, in which the fuel cell module 170 and FIC 180 also participate, may automatically adjust power drawn by each static UPS 120 to maintain the protected power required by the critical load.

In one or more embodiments, droop control may be a proportional-derivative (PD) control. For example, the following equations may be used to automatically control the IPRB bus, without the need to communicate directly with the static UPSs 120:

$$f = f_n - K_{Pdroop}P_{av} - K_{Ddroop}\frac{dP_{av}}{dt} \text{ and}$$

$$V = V_n - K_{pQf}Q_{av}$$

where f is the voltage frequency, $f_n$ is the nominal voltage frequency (for example, 50 or 60 hertz (Hz)), $P_{av}$ is the low-pass filtered active power, V is the voltage amplitude, $V_n$ is the nominal voltage amplitude, and $Q_{av}$ is the low-pass filtered reactive power, all quantities with respect at the output of a static UPS 120 or an FIC 180. $K_{Pdroop}$, $K_{Ddroop}$, and $K_{pQf}$ are constants that may be set in advance by the user to provide the desired droop control. In one or more embodiments, the constants may be the same for each static UPS 120.

In one or more embodiments, an IPRB system 200 may appear as seen in FIG. 2. Static UPSs 220 may be electrically connected to an external electrical power source 230, such as a utility feed. Each static UPS 220 may include or be connected to one or more batteries 222 or the like. The output of each static UPS 220 may be electrically connected to a load 240 via a PDU (Power distribution unit) that includes a transformer. As shown in FIG. 2, the loads 240 may be single-corded loads. In the event that a static UPS 220 is unable to supply part or all of the load 240, the other static UPSs 220 will share the total load of the system 200 by automatically redistributing power according to the droop control. No communication may be necessary between the static UPSs to correctly redistribute the power. For example, if one static UPS 220 were to entirely fail, the three other static UPSs 220 shown in FIG. 2 may carry the load for the entire system, including the load 240 corded to the failed static UPS 220. The output of each static UPS 220 may be connected to the ring bus 210 via a corresponding choke 250. A bypass circuit breaker 260 may be connected in parallel to each choke 250.

Further, the IPRB system 200 may include more than one fuel cell module 270 along with the corresponding FIC 280 and choke 252. A bypass circuit breaker 262 may be in parallel with the choke 252. In one or more embodiments, the FICs 280 may receive communication for grid ancillary services. For example, during a period of heavy usage, a utility company may request a reduction in power utilized by a datacenter. With an IPRB system 200 that includes one or more fuel cell modules 270, the fuel cell modules may be started and supply power to the system 200 without any need to communicate with the static UPSs 220. The droop control may automatically produce a reduction in demand from the utility feed, fulfilling the utility company's request.

The IPRB system 200 shown in FIG. 2 was used to simulate the example for reduced demand from the power grid presented above. In the initial steady state, shown at about 0.2 seconds in FIG. 3, four static UPSs 220 each provide 600 kilowatts (kW) of low-pass filtered active power to supply a 2.4 megawatt (MW) total load of the system 200. At approximately 0.3 seconds, the two fuel cell modules 280 are turned on. During the transition period, the droop control, for example a proportional-derivative (PD) control, automatically redistributes the load so that the total load is distributed equally between the four static UPSs 220 and the two fuel cell modules 270. Thus, each of the six devices 220, 270 supplies 400 kW once the new steady state is reached, for a total of 2.4 MW. By adding the two fuel cell modules 270, the utility draw would be reduced by 800 kW with no impact to the load. The two FICs are turned on without causing any sort of interruption to the data center load. FIGS. 4A and 4B show the load voltage and the load current, respectively, as a function of time for all three phases. FIGS. 4A and 4B show that the load voltage and the load current were not disturbed when the two FICs are turned on due to the way in which the IPRB with static UPS architecture works.

Referring now to FIG. 5, according to one or more embodiments, an IPRB system 500 may include static UPSs 520, chokes 550, 552, bypass circuit breakers 560, 562, a ring bus 510 and one or more loads 540 as discussed above. It may also be possible to have a bidirectional FIC 580 electrically connected to a fuel cell module/electrolyzer 570. During periods of high demand or high energy costs, the fuel cell module/electrolyzer 570, the bidirectional FIC 580 and the corresponding choke 552 may function as previously described to supply electric power to the system 500 and to the system's critical load. However, with a bidirectional FIC 580, power may drawn by the fuel cell module/electrolyzer 570 from the IPRB system 500 and used to generate molecular hydrogen, which may be stored in hydrogen storage 572 that is connected to the fuel cell module/electrolyzer 570. This stored hydrogen may be used as fuel for the fuel cell module 570 when desired.

In the above example from FIG. 5, "premium" protected power was withdrawn from the IPRB system 500 to generate hydrogen. However, it may be more cost effective to use power from the utility grid or another source such as on-site solar to generate hydrogen.

Referring to FIG. 6, according to one or more embodiments, an IPRB system 600 may include static UPSs 620, chokes 650, 652, bypass circuit breakers 660, 662, a ring bus 610 and one or more loads 640 as discussed above. It may also include a fuel cell module/electrolyzer 670 coupled to hydrogen storage 672 and electrically connected to a bidirectional FIC 680. The FIC 680 may be electrically connected to the ring bus 610 via a corresponding choke 652. The bidirectional FIC 680 may be connected to an external electrical power source 632. The external electrical power source 632 may be the power grid, or it may be some other source like solar or wind power among others. The bidirectional FIC 680 may also include a fast transfer switch that allows power from the external electrical power source 632 to be converted to DC and directed to the fuel cell module/electrolyzer 670 to generate hydrogen, or it may pass power to the ring bus 610 to supply the critical load.

In one or more embodiments, an FIC 680, including a bidirectional FIC, may be a special double conversion static UPS (rectifier-DC bus-inverter system) designed such that the fuel cell module 670 may electrically connect to the DC bus, or to a power port of FIC 680.

Referring to FIG. 7, according to one or more embodiments, a method of turning on fuel cell modules to provide power to the system load without producing an interruption may include a utility requesting a reduction in power consumption from the datacenter or similar facility where an IPRB system is operating S710. In other cases, the utility power rate may be high and is predicted to be high for a period of time S720. In yet other cases, a UPS may need to be taken out for maintenance or due to a UPS failure S730. In each of these cases S710, S720, S730 a signal may be sent to an FIC and fuel cell system to start up S740. Because all UPSs can handle short periods of overloading, the initial start-up period may be powered using a battery or some other short-term energy storage that may be available S745. Temporary UPS overloading may be used to assist start-up. The FIC may start supplying power to the loads via droop control and the ring bus S750. The UPS utility power consumption drops adhering to the droop control S760. This allows the load supply to be maintained without any interruption S770.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claims is:

1. A system comprising:
    a ring bus;
    a plurality of static uninterruptible power supplies (UPSs), each static UPS of the plurality of static UPSs comprising:
        at least one battery;
        an input that is electrically connected to a respective first external electrical power source; and
        an output that is electrically connected to a respective load, and, via a first corresponding unswitchable choke, without any intervening switch to the ring bus;
    at least one fuel-cell interface converter (FIC) that converts direct current (DC) electrical power to alternating current (AC) electrical power, each FIC of the at least one FIC being electrically connected to the ring bus via a second corresponding unswitchable choke, without any intervening switch to the ring bus; and
    a respective fuel cell module corresponding to and electrically connected to each FIC, each fuel cell module comprising a respective fuel cell,
    wherein each FIC of the at least one FIC supplies AC electrical power to one or more of the respective loads indirectly via the ring bus and does not directly supply any other AC electrical load.

2. The system according to claim 1, wherein the at least one FIC is bidirectional, converting DC electrical power to AC power or AC electrical power to DC electrical power, based on direction of electrical power through the at least one FIC.

3. The system according to claim 2, wherein the fuel cell module corresponding to the at least one bidirectional FIC is coupled to hydrogen storage and produces hydrogen when receiving electrical power from the at least one FIC.

4. The system according to claim 3, wherein the at least one bidirectional FIC is electrically connected to a second external electrical power source.

5. The system according to claim 4, wherein the at least one bidirectional FIC comprises a fast transfer switch that receives electrical power from the second external electrical power source and directs the electrical power from the second external electrical power source to the ring bus or to the corresponding fuel cell module.

6. The system according to claim 4, wherein the second external electrical power source and the respective first external electrical power source are a same source.

7. The system according to claim 1, the system further comprising, for each first corresponding unswitchable choke, a corresponding bypass circuit breaker in parallel with each first corresponding unswitchable choke.

8. The system according to claim 1, the system further comprising, for each second corresponding unswitchable choke, a corresponding bypass circuit breaker in parallel with each second corresponding unswitchable choke.

9. The system according to claim 1, wherein the at least one FIC comprises a second static UPS, wherein the corresponding fuel cell module is electrically connected to a DC bus of the second static UPS that is disposed between an output of a rectifier and an input to an inverter.

10. The system according to claim 1, wherein at least one respective load is a dual-corded load that is electrically connected to at least two static UPSs of the plurality of static UPSs.

11. The system according to claim 1, wherein at least one respective load is a single-corded load that is electrically connected to only one static UPS of the plurality of static UPSs.

12. The system according to claim 1, wherein the respective fuel cell comprises a member of a group consisting of a hydrogen fuel cell, a hydrocarbon fuel cell, a proton-exchange membrane fuel cell, an alkaline fuel cell, a solid oxide fuel cell, and a phosphoric acid fuel cell.

13. A method for injecting electrical power from at least one fuel cell module into a ring bus architecture, the ring bus architecture comprising:
a ring bus;
a plurality of static uninterruptible power supplies (UPSs), each static UPS of the plurality of static UPSs comprising:
at least one battery;
an input that is electrically connected to respective external electrical power source; and
an output that is electrically connected to a respective load, and, via a first corresponding unswitchable choke, without any intervening switch to the ring bus,
the method comprising:
electrically connecting the at least one fuel cell module in series with a corresponding fuel-cell interface converter (FIC) that converts direct current (DC) electrical power to alternating current (AC) electrical power and a second corresponding unswitchable choke without any intervening switch to the ring bus; and
starting the at least one fuel cell module
wherein each corresponding FIC supplies the AC electrical power to one or more respective loads indirectly via the ring bus and does not directly supply any other AC electrical load.

14. The method according to claim 13, wherein a droop control automatically adjusts a voltage and a frequency of an electrical power at the output of each static UPS.

15. The method according to claim 14, wherein the droop control is a proportional derivative droop control.

16. The method according to claim 13, wherein:
a frequency of an output voltage of each static UPS of the plurality of static UPSs depends on an low-pass filtered active power and a time derivative of the low-pass filtered active power at the output of each static UPS, and
a voltage amplitude at the output of each static UPS depends on the low-pass filtered reactive power at the output of each static UPS.

17. A method of turning on at least one fuel cell module in a system without interrupting power to a system load, the system comprising:
a ring bus;
a plurality of static uninterruptible power supplies (UPSs), each static UPS of the plurality of static UPSs comprising:
at least one battery;
an input that is electrically connected to respective external electrical power source; and
an output that is electrically connected to a respective load, and, via a first corresponding unswitchable choke, without any intervening switch to the ring bus,
the method comprising:
sending a signal to a fuel cell system to start up, the fuel cell system comprising the at least one fuel cell module, a respective fuel-cell interface converter (FIC) electrically connected to an output of the at least one fuel cell module and that converts direct current (DC) electrical power to alternating current (AC) electrical power, and a second corresponding unswitchable choke that electrically connects an output of the respective FIC to the ring bus without any intervening switch;
providing, from the at least one battery, electrical power during start-up of the fuel cell system;
supplying electrical power from the fuel cell system to at least one load via droop control applied to the respective FIC and the at least one static UPS, and the ring bus; and
reducing power consumption from a source external to the system,
wherein each respective FIC supplies AC electrical power to one or more respective loads indirectly via the ring bus and does not directly supply any other AC electrical load.

* * * * *